United States Patent
Yang et al.

(10) Patent No.: US 7,929,524 B2
(45) Date of Patent: Apr. 19, 2011

(54) APPARATUS AND METHOD TO HIDE TRANSIT ONLY MULTI-ACCESS NETWORKS IN OSPF

(75) Inventors: Yi Yang, Morrisville, NC (US); Alvaro E. Retana, Raleigh, NC (US); James L. Ng, Mebane, NC (US); Abhay Roy, Santa Clara, CA (US); Alfred C. Lindem, Cary, NC (US); Sina Mirtorabi, Santa Clara, CA (US); Timothy M. Gage, Durham, NC (US); Syed Khalid Raza, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 11/537,275

(22) Filed: Sep. 29, 2006

(65) Prior Publication Data

US 2008/0080494 A1    Apr. 3, 2008

(51) Int. Cl.
*H04L 12/28* (2006.01)
*H04W 4/00* (2009.01)
*G06F 15/177* (2006.01)

(52) U.S. Cl. ........ 370/389; 370/238; 370/252; 370/354; 370/392; 370/401; 709/220; 709/222; 709/228; 709/230; 709/238

(58) Field of Classification Search .......... 370/216–503; 709/220–238
See application file for complete search history.

(56) References Cited

U.S. PATENT DOCUMENTS

| | | | |
|---|---|---|---|
| 6,339,595 B1 * | 1/2002 | Rekhter et al. | 370/392 |
| 6,418,139 B1 * | 7/2002 | Akhtar | 370/356 |
| 6,473,421 B1 * | 10/2002 | Tappan | 370/351 |
| 6,768,739 B1 * | 7/2004 | Kobayashi et al. | 370/392 |
| 6,999,454 B1 * | 2/2006 | Crump | 370/389 |
| 7,047,315 B1 * | 5/2006 | Srivastava | 709/238 |
| 7,088,718 B1 * | 8/2006 | Srivastava | 370/392 |
| 7,133,403 B1 * | 11/2006 | Mo et al. | 370/390 |
| 7,173,912 B2 * | 2/2007 | Jaber et al. | 370/254 |
| 7,209,976 B2 * | 4/2007 | Folkes et al. | 709/238 |
| 7,281,129 B2 * | 10/2007 | Zaborovsky et al. | 713/162 |
| 7,292,535 B2 * | 11/2007 | Folkes et al. | 370/238 |
| 7,307,990 B2 * | 12/2007 | Rosen et al. | 370/392 |
| 7,532,631 B2 * | 5/2009 | Raszuk et al. | 370/401 |
| 7,561,571 B1 * | 7/2009 | Lovett et al. | 370/392 |
| 7,649,834 B2 * | 1/2010 | Badat et al. | 370/216 |
| 7,664,110 B1 * | 2/2010 | Lovett et al. | 370/392 |
| 7,685,281 B1 * | 3/2010 | Saraiya et al. | 709/226 |

(Continued)

OTHER PUBLICATIONS

PCT Notification of Transmittal of the International Search Report and the Written Opinion of the International Searching Authority, or the Declaration, mailed Jul. 30, 2008, International Application No. PCT/US07/67819, International Filing Date: Apr. 30, 2007, 9 pages.

*Primary Examiner* — Ayaz R Sheikh
*Assistant Examiner* — Venkatesh Haliyur
(74) *Attorney, Agent, or Firm* — Cesari and McKenna, LLP

(57) ABSTRACT

A system for hiding transit-only interfaces in a network. When a routing system is advertising a transit-only interface, the advertisement is marked to indicate the address is a transit-only interface. A routing system receives the advertisement and detects the identifier of the transit-only interface and does not store the address in the Router Information Base of the routing system.

15 Claims, 4 Drawing Sheets

U.S. PATENT DOCUMENTS

| | | | |
|---|---|---|---|
| 7,697,416 B2* | 4/2010 | Shand et al. | 370/216 |
| 2002/0006112 A1* | 1/2002 | Jaber et al. | 370/238 |
| 2003/0218982 A1* | 11/2003 | Folkes et al. | 370/238 |
| 2004/0006640 A1* | 1/2004 | Inderieden et al. | 709/242 |
| 2004/0039839 A1* | 2/2004 | Kalyanaraman et al. | 709/238 |
| 2004/0258016 A1* | 12/2004 | Schmidt et al. | 370/329 |
| 2005/0041596 A1* | 2/2005 | Yokomitsu et al. | 370/252 |
| 2005/0074003 A1* | 4/2005 | Ball et al. | 370/389 |
| 2005/0094566 A1* | 5/2005 | Hares | 370/238 |
| 2005/0213557 A1* | 9/2005 | Hwang et al. | 370/351 |
| 2006/0034171 A1* | 2/2006 | Rajsic et al. | 370/235 |
| 2006/0056411 A1* | 3/2006 | Badat et al. | 370/392 |
| 2006/0233181 A1* | 10/2006 | Raszuk et al. | 370/401 |
| 2007/0016637 A1* | 1/2007 | Brawn et al. | 709/200 |
| 2007/0237095 A1* | 10/2007 | Yang et al. | 370/254 |
| 2008/0062861 A1* | 3/2008 | Shand et al. | 370/217 |

* cited by examiner

APPARATUS AND METHOD TO HIDE TRANSIT ONLY MULTI-ACCESS NETWORKS IN OSPF

FIELD OF THE INVENTION

This invention relates to routers. More particularly, this invention relates to routers that are only connected to other routers in a network. Still more particularly, this invention relates to a method for protecting interfaces on these routers from the network to increase security of the network.

PRIOR ART

In today's home and business environment there are many different types of digital networks that allow processing systems to communicate and transmit data between one another. As the size of these networks increases, more routers or other switching systems are needed in the network to transmit data between processing systems. Some systems are so large that some routers have interfaces that are connected directly to other routers to transmit data over the other routers to other systems.

One method for determining a path for transmitting data from one processing system over the network to another system is Open Shortest Path First (OSPF). In OSPF, a router receives Link State Advertisements (LSA) from other routing systems. Each LSA indicates a connection of a router to another system or router. A router then stores the received LSAs and uses the LSAs to determine the path over which to transmit data to a particular address. In the larger networks, the connections between routers are used to transmit data. However, the addresses of the interfaces that connect a router to another router are not needed. Thus, transmitting LSAs with the addresses of these interfaces is a problem. The addresses of the interfaces are installed in Router Information Base (RIB) of other routers when received in an LSA. This wastes router resources as the addresses are stored in the RIB and then the router advertises the link.

Another problem with advertising the addresses for these interfaces is that an attacker can launch an attack on the network by sending packets to one of these interfaces. Thus, there is a need in the art for a system to hide these interfaces from the network to improve convergence of the network and to increase security.

BRIEF DESCRIPTION OF THE DRAWINGS

The features and advantages of this invention are described in the following detailed description and are shown in the following drawings.

DETAILED DESCRIPTION

This invention relates to a method to hide transit-only interfaces in a network. For purposes of this discussion, transit-only interfaces are interfaces which directly connect one router to another router. In accordance with the present invention, the routers perform applications which hide the transit-only interfaces in a network in accordance with this invention. These applications may be performed as software, hardware, and/or firmware that are included in the router.

Figure 1:
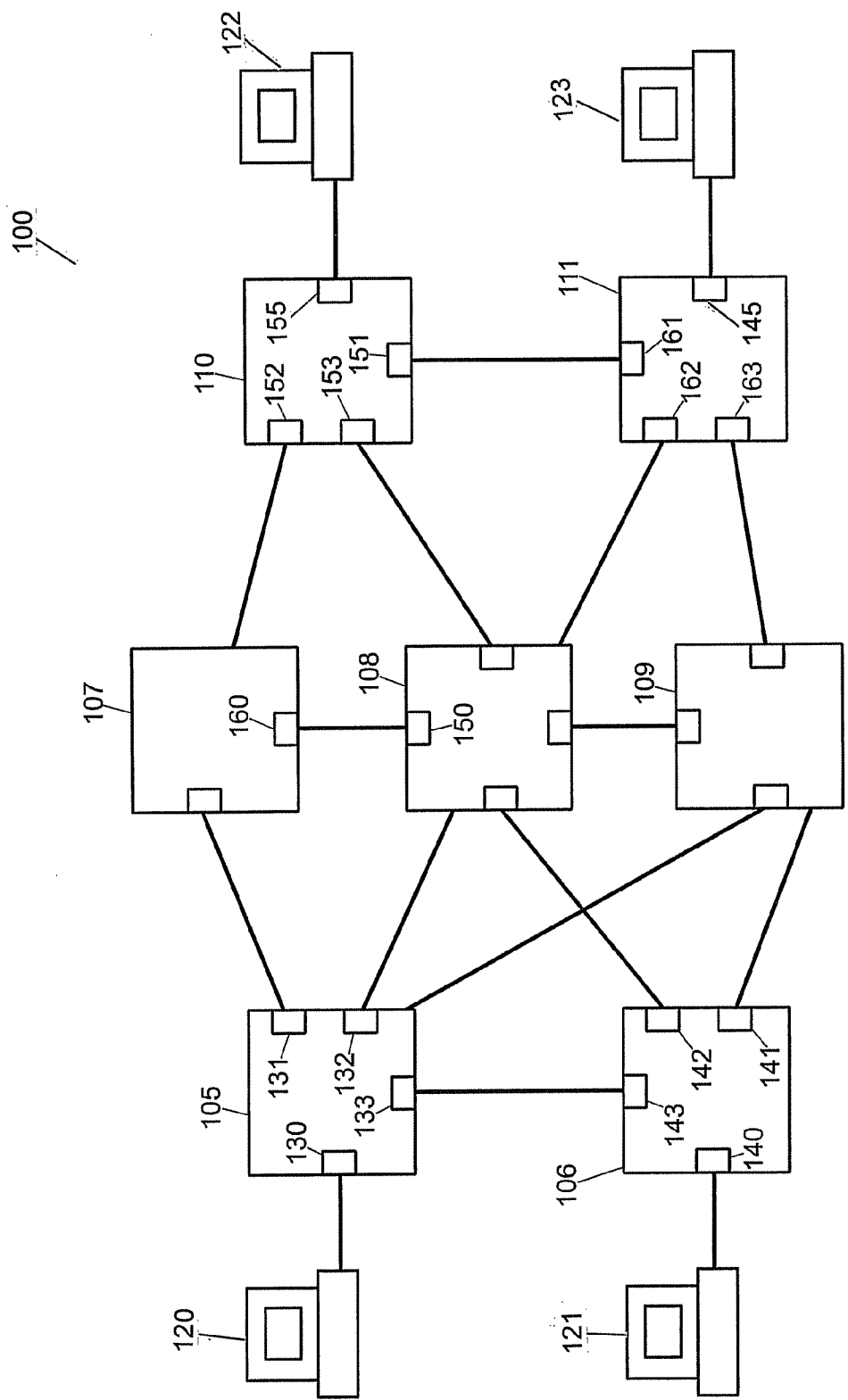
FIG. 1 illustrating an exemplary network having transit-only routers operating in accordance with this invention.

FIG. 1 illustrates a network that includes routing systems that have transit-only interfaces in accordance with this invention. Network 100 includes routing systems 105-111. Routing systems 105-111 are routers, switches, or other processing devices that transmit data to other systems over networks 100. One skilled in the art will recognize that network 100 is shown for illustrative purposes only and the exact configuration of a network is not important to implementing this invention. Thus, the exact configuration and size of a network implementing processes in accordance with this invention are left to one skilled in the art designing a system implementing processes in accordance with this invention. Furthermore, the connection and interfaces of the routing systems shown are for exemplary purposes. The exact number of interfaces and the connections to the interfaces are left to those skilled in the art.

The routing systems in network 100 use OSPF to determine a path for transmitting a packet from one processing system to another. In the exemplary embodiment shown, OSPFv2 is used to make determinations of the paths for transmission of packets. In OSPFv2, Internet Protocol (IP) version 4 (IPv4) addressing is used. Although discussed in terms OSPFv2 and IPv4, one skilled in the art will recognize that this invention may be implemented in other protocols using other addressing strategies.

In network 100, routing systems 105, 106, 110, and 111 connect servers 120-123 to network 100. Routing system 105 connects to server 120 via interface 130 and connects to other routers 106-108 via interfaces 131-133. Routing system 106 connects to server 121 via interface 140 and interfaces 141-143 connect routing system 106 to other routing systems. Routing system 110 connects to server 122 via interface 155 and to other routing systems via interfaces 151-153. Routing system 111 connects to router 111 via interface 160 and to other routing systems via interfaces 161-163.

In network 100, routing systems 107-109 are transit-only routing systems. Routing systems 107-109 are transit-only routing systems because these routing systems are only connected to other routing systems to transmit data between the routing systems that connect processing systems to the network. For example, interface 150 in routing system 108 connects routing system 108 to an interface 160 of routing systems 107.

Routing systems may only have one or a portion of the interfaces in the router that are transit-only. For example, routing system 105 has an interface 133 that connects routing system 105 to routing system 106 via interface 143. Thus, a system for hiding transit-only interfaces may be implemented in all routing systems in network 100.

Figure 2:
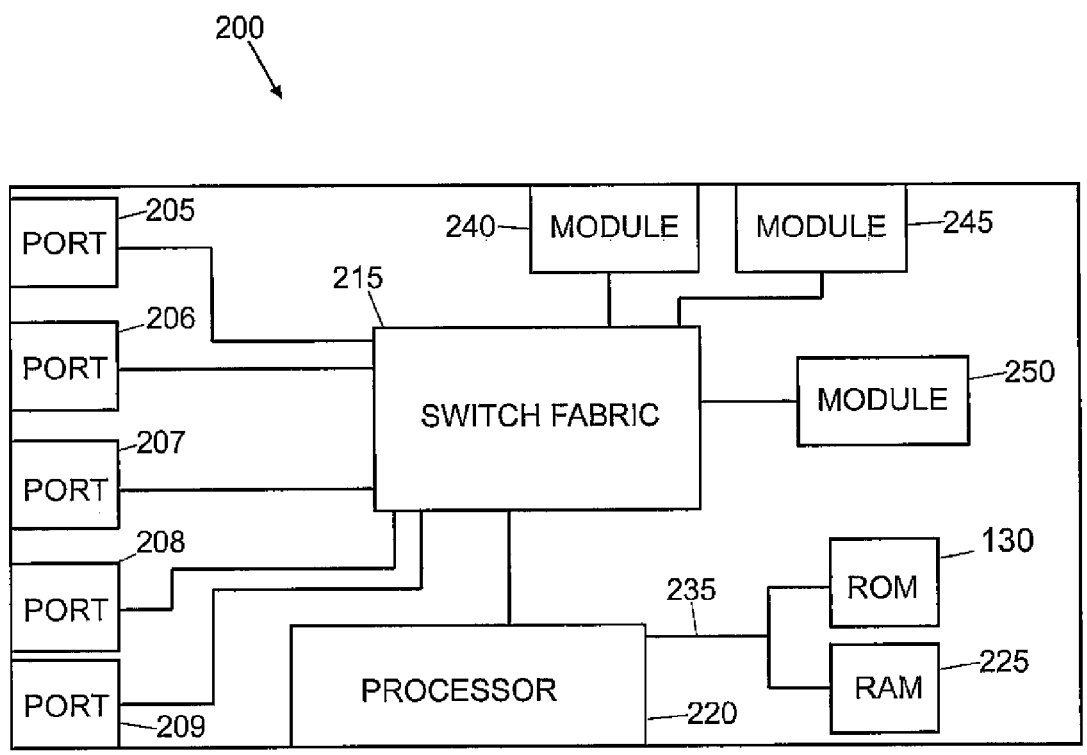
FIG. 2 illustrating a block diagram of components of a routing system operating in accordance with this invention.

FIG. 2 shows a router 200. Routing systems 105-111 (Shown in FIG. 1) are all examples of router 200. Router 200 is a routing and/or switching system that transmits digital data, in the form of packets between processing systems connected to a network. One skilled in the art will recognize that router 200 may be a router, switch or any other processing system that receives and transmits digital data.

Router 200 includes ports 205-209. Ports 205-209 connect router 200 to other processing systems in a network. The other processing systems that may be connected include computers, other routers or any other digital processing system. One skilled in the art will further recognize that ports 205-209 are shown for exemplary purposes only and the exact number and configuration of the ports are left to one skilled in the art designing a specific router.

Ports 205-209 are connected to switch circuitry 215. Switch circuitry 215 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 220 is connected to switching circuitry 215. Processing unit 220 is a processor, microprocessor, or any combination of processors and microprocessors that execute instructions to perform applications for performing functions in router 200. Processing unit 220 is also connected to a volatile memory 225 and a non-volatile memory 230 via memory bus 235.

Volatile memory 225 is a memory such as a Random Access Memory (RAM). A volatile memory stores instructions and data used by processing unit 220 to perform applications. One such application is a routing operating system. The routing operating system is an application or applications which allow router 200 to perform other applications that provide the functions of router 200. An example of a routing operating system is Inter-network Operating System (IOS) designed by Cisco Systems Inc. One Skilled in the art will recognize that many different types of memory may be used a non-volatile memory such SRAM and DRAM.

Non-volatile memory 230 is a memory such as a Read Only Memory (ROM). Non-volatile memory 230 stores configuration and other vital information for router 200. One skilled in the art will recognize that there are many different types of memory that may be used as a non-volatile memory.

Modules 240, 245, and 250 are connected to switching circuitry 215. Modules 240, 245, and 250 are devices and/or software that prepare specific features in router 200. An example of a module is a Voice Over Internet Protocol (VoIP) module for providing telephonic communications to processing devices connected to router 200. One skilled in the art will recognize that the number of modules and the functions that each module provides may be determined by one skilled in the art designing a particular router.

In accordance with this invention, a system for hiding transit-only interfaces of routing systems is provided by processes executed by the routing systems as shown by the following exemplary embodiments. One skilled in the art will recognize that the following processes may be executed by software, firmware, hardware, and/or any combination of the preceding components.

Figure 3:
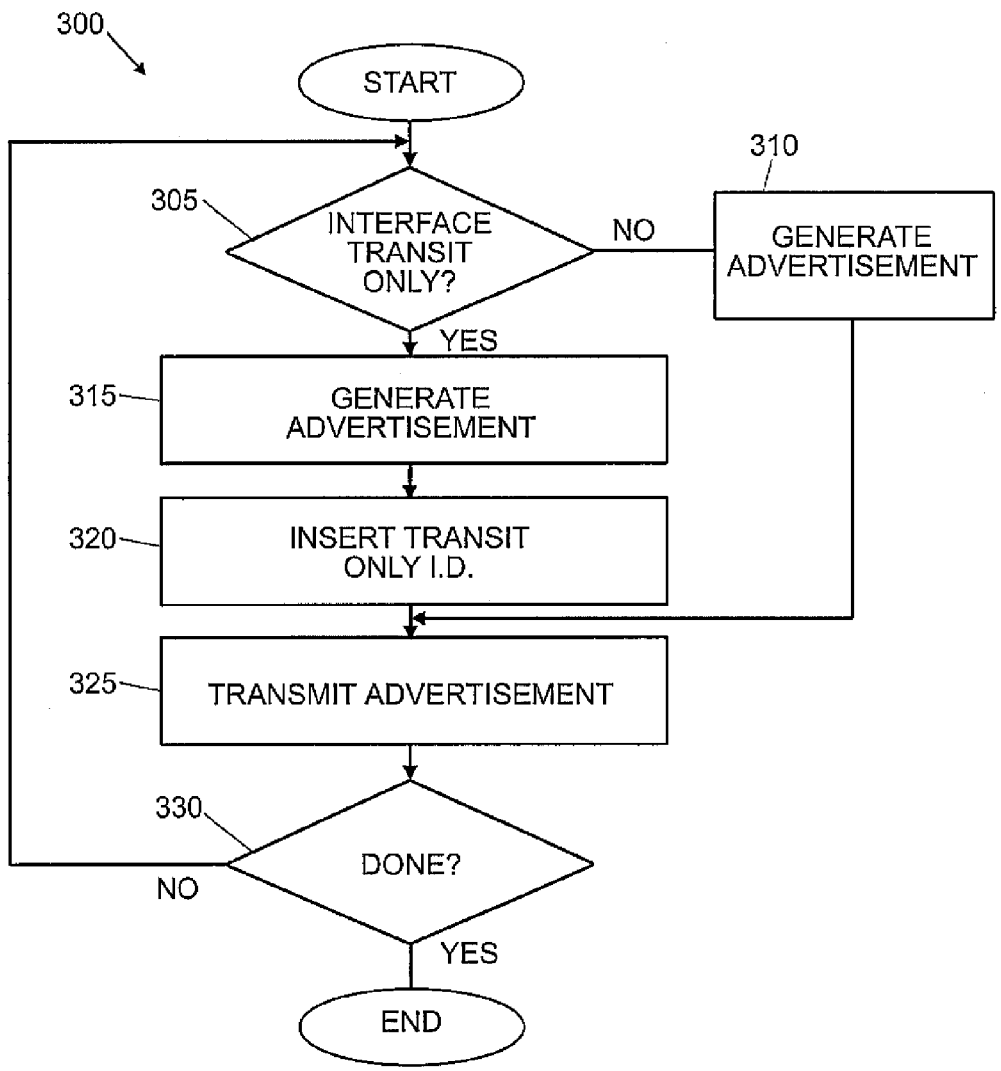
FIG. 3 illustrating a flow diagram of an exemplary process for generating and transmitting a link state advertisement in accordance with this invention.
Figure 4:
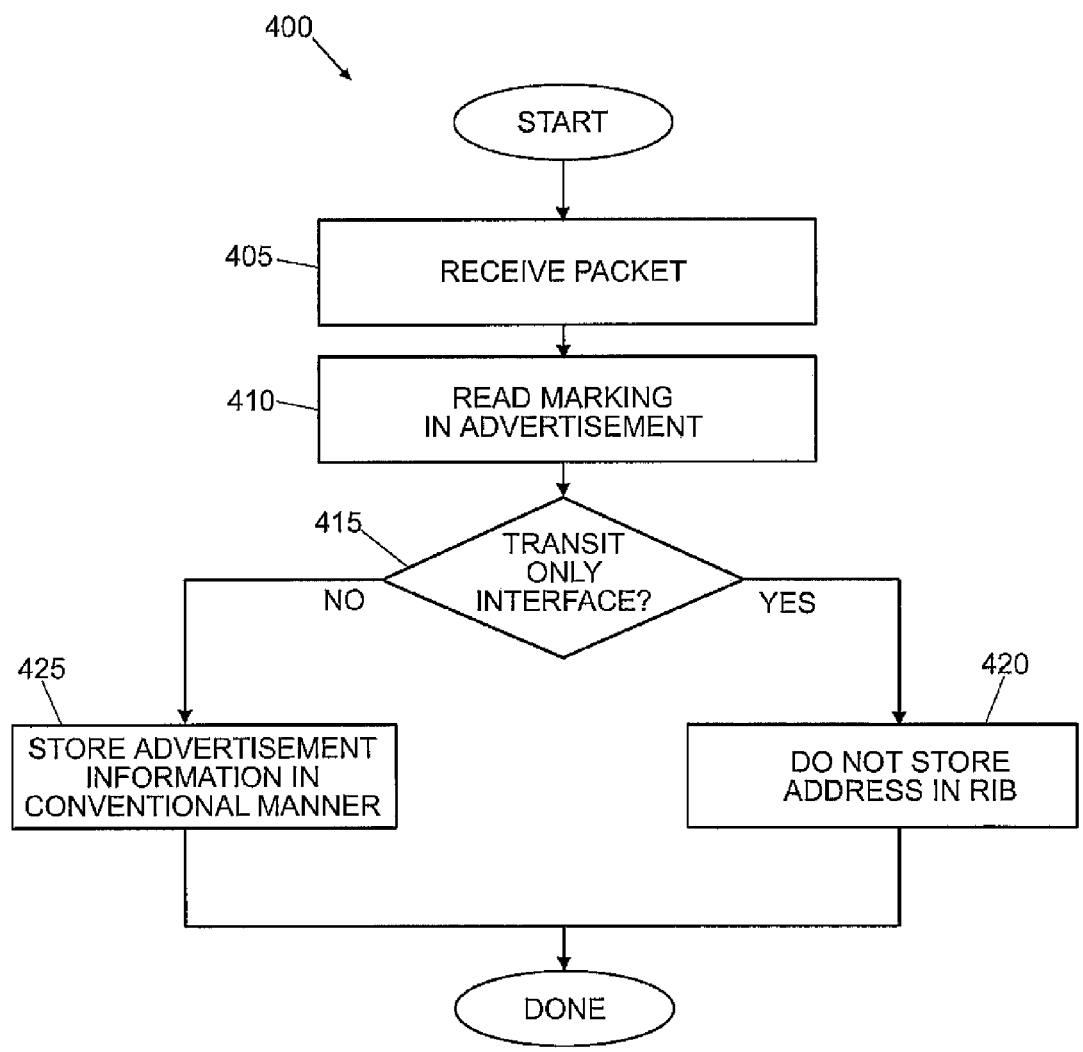
FIG. 4 illustrating a flow diagram of an exemplary process for receiving and handling a link state advertisement generated in accordance with this invention.

In order to hide transit-only interfaces, a routing system must be able to identify a transit-only interface to other routing systems and the other routing systems must know how to handle an interface that is identified as transit only. FIG. 3 illustrates an exemplary embodiment of a process executed by a first routing system to identify transit-only interface in advertisements. FIG. 4 then illustrates an exemplary embodiment of a process for a router receiving an advertisement of a transit-only interface and storing the information.

FIG. 3 illustrates an exemplary process 300 executed by a routing system to identify a transit-only interface to other routing systems. Process 300 begins in step 305 by the routing system determining that an interface is a transit-only interface. The determination is performed in a typical manner that a routing system performs detections of connections to the routing system. If the interface is determined not to be a transit-only interface, the routing system generates an advertisement in a normal manner in accordance with the art in step 310. One skilled in the art will recognize that the advertisement is an LSA in OSPF and is generated in the manner defined in OSPF. The advertisement is then transmitted in the normal manner in step 325.

If the interface is determined to be transit only, an advertisement is generated in step 315. In the preferred embodiment, the advertisement is an LSA and is generated in a typical manner. After the advertisement is generated, a transit-only identification is inserted into the packet to indicate that the advertised interface is transit-only in step 320.

In exemplary embodiments, there are a variety of manners in which an advertisement for a transit-only interface may be marked. A first method for marking a transit-only interface is by placing an invalidate and/or non-continuous network mask instead of the configured value for the network. For example, the value 0x00000001 may be inserted instead of the configured value. Because the network mask is invalid the OSPF does not install the address in the RIB. In a network using this method, some vendors may do a sanity check and when the advertisements with invalid masks are detected, these advertisements may be dropped. This could disrupt communications over the network.

A second method for marking advertisements for transit only interfaces uses a valid, designated network mask, such as, a network mask that should not be used in a multi-access network. Some examples of this include 0xffffffff and 0xfffffffe. Routing systems using a system in accordance with the invention must not place the advertised addresses in the RIB. However, non-upgrades systems will still flood the networks with the advertisements. Thus, this method is more predictable than using an invalid mask. However, the host addresses of a transmitting routing system may be installed in the RIBs of non-upgraded systems. Thus, the interfaces may still be attacked.

A third method for marking advertisements for transit-only interfaces is to place a flag or administrative tag in the advertisements. Such tags are described in the IETF draft of "Extensions to OSPFv2 for advertising Optional Rout/Link Attributes." This will require all routers to be upgraded to read the tag and recognize the advertisement is for a transit-only interface. Furthermore, this method requires support of opaque Link State Advertisements. This may cause backward compatibility issues.

After the advertisement is generated and the mask is inserted, the advertisement is transmitted in the conventional manner in step 325. In step 330, the router determines whether all of the advertisements for interfaces have been transmitted. If there are more advertisements to generate, process 300 repeats for step 305. Otherwise process 300 ends.

FIG. 4 illustrates an exemplary process executed by a routing system when an advertisement is received to hide a transit-only interface in accordance with this invention. Process 400 begins in step 405 with an advertisement being received by the routing system. In step 410, the identifier is read.

The routing system then determines whether the advertised address is a transit-only interface in step 415. If the first method of using an invalid mask is used, all routing systems will recognize the invalid mask and not install the address in the RIB. If the second or third methods are used, the receiving routing systems must be upgraded to detect the identifier. If the identifier is read from the advertisement, the advertisement information is stored in a conventional manner. However, the advertised address is not stored in RIB of the routing system in step 420. If the identifier is not read, the advertised information is stored in the conventional manner in step 425. Process 400 then ends.

The above is a description of exemplary embodiments of a method for hiding transit-only interfaces in a network. It is envisioned that those skilled in the art can and will design alternative systems for hiding transit-only interfaces that infringe on this invention as set forth in the following claims either literally or through Doctrine of Equivalents.

What is claimed is:

1. A method comprising:
   receiving an advertisement from a first routing system in a network at another routing system in said network, said advertisement including an address of an interface of said first routing system and an indication that said interface of said first routing system is a transit-only interface of said first routing system, wherein a transit-only interface is an interface that directly connects to only interfaces of one or more other routing systems to transmit data between said first routing system and said other routing systems;
   reading said advertisement by said another routing system;
   determining that said advertisement includes said indication; and
   declining to store said address of said interface of said first routing system included in said advertisement in a Router Information Base (RIB) of said another routing system, in response to determination said advertisement includes said indication that said interface of said first routing system is a transit-only interface,
   wherein said advertisement is an Open Shortest Path First (OSPF) Link State Advertisement (LSA) and said indication in said advertisement that said interface of said first routing system is a transit-only interface is a particular valid network mask.

2. An apparatus comprising:
   an interface configured to receive an advertisement from a first routing system, said advertisement including an address of an interface of said first routing system and an indication that said interface of said first routing system is a transit-only interface of said first routing system, wherein a transit-only interface is an interface that directly connects to only interfaces of one or more other routing systems to transmit data between said first routing system and said other routing systems;
   a processing unit configured to execute a process to read said advertisement and to determine that said advertisement includes said indication; and
   a memory configured to maintain a Router Information Base (RIB), said RIB to decline to store said address of said interface of said first routing system included in said advertisement, in response to determination said advertisement includes said indication that said interface of said first routing system is a transit-only interface,
   wherein said advertisement is an Open Shortest Path First (OSPF) Link State Advertisement (LSA) and said indication in said advertisement that said interface of said first routing system is a transit-only interface is a particular valid network mask.

3. A method for hiding a transit-only interface of a first routing system comprising:
   determining that an interface of said first routing system is a transit-only interface, wherein a transit-only interface is an interface that directly connects to only an interface of a second routing system to transmit data between said first routing system and said second routing system;
   generating an advertisement to transmit over a network to other routing systems in said network wherein said advertisement indicates an address of said interface of said first routing system that directly connects to only said interface of said second routing system;
   inserting an indication in said advertisement that said interface of said first routing system is a transit-only interface, said indication in said advertisement to cause said other routing systems in said network to decline to store said address of said interface of said first routing system indicated in said advertisement in Router Information Bases (RIBs) of said other routing systems; and
   transmitting said advertisement to said other routing systems in said network,
   wherein said advertisement is an Open Shortest Path First (OSPF) Link State Advertisement (LSA) and said indication in said advertisement that said interface of said first routing system is a transit-only interface is a particular valid network mask.

4. An apparatus for hiding a transit-only interface of a first routing system comprising:
   means in said first routing system for determining that an interface of said first routing system is a transit-only interface, wherein a transit-only interface is an interface that directly connects to only an interface of a second routing system to transmit data between said first routing system and said second routing system;
   means in said first routing system for generating an advertisement to transmit over a network to other routing systems in said network, wherein said advertisement indicates an address of said interface of said first routing system that directly connects to only said interface of said second routing system;
   means in said first routing system for inserting an indication in said advertisement that said interface of said first routing system is a transit-only interface, said indication in said advertisement that said interface of said first routing system is a transit-only interface to cause said other routing systems in said network to decline to store said address of said interface of said first routing system indicated in said advertisement in Router Information Bases (RIBs) of said other routing systems; and
   means in said first routing system for transmitting said advertisement to said other routing systems in said network,
   wherein said advertisement is an Open Shortest Path First (OSPF) Link State Advertisement (LSA) and said indication in said advertisement that said interface of said first routing system is a transit-only interface is a particular valid network mask.

5. An apparatus comprising:
   a processing unit configured to determine that an interface of said apparatus is a transit-only interface, wherein a transit-only interface is an interface that directly connects to only an interface of a routing system;
   said processing unit further configured to generate an advertisement to transmit over a network to another routing system in said network, said advertisement including an address of said interface of said apparatus and an indication that said interface is a transit-only interface, said indication to indicate that said address of said interface of said apparatus included in said advertisement should not be stored in a Router Information Base (RIB) of said another routing system upon receipt of said advertisement; and
   an interface configured to transmit said advertisement to said another routing system in said network,
   wherein said advertisement is an Open Shortest Path First (OSPF) Link State Advertisement (LSA) and said indication in said advertisement that said interface of said first routing system is a transit-only interface is a particular valid network mask.

6. The apparatus of claim 5 wherein said particular valid network mask is 0xffffffff.

7. The apparatus of claim 5 wherein said particular valid network mask is 0xfffffffe.

8. The method of claim 3 wherein said particular valid network mask is a valid unused network mask.

9. The method of claim 3 wherein said particular valid network mask is 0xffffffff.

10. The method of claim 3 wherein said particular valid network mask is 0xfffffffe.

11. The method of claim 3 wherein routing systems in said network use OSPF and Enhanced Interior Gateway Routing Protocol to determine a path used to transmit data from one routing system in said network to another routing system in said network.

12. The apparatus of claim 4 wherein said particular valid network mask is a valid unused network mask.

13. The apparatus of claim 4 wherein said particular valid network mask is 0xffffffff.

14. The apparatus of claim 4 wherein said particular valid network mask is 0xfffffffe.

15. The apparatus of claim 4 wherein routing systems in said network use OSPF and Enhanced Interior Gateway Routing Protocol to determine a path used to transmit data from one routing system in said network to another routing system in said network.

* * * * *